June 30, 1931.   R. FRIEDL   1,812,289

CYLINDER HEAD FOR INTERNAL COMBUSTION MOTORS

Original Filed Aug. 30, 1927

INVENTOR.
Ralph Friedl.
BY Townsend, Loftus & Abbett
ATTORNEYS.

Patented June 30, 1931

1,812,289

UNITED STATES PATENT OFFICE

RALPH FRIEDL, OF ALAMEDA, CALIFORNIA

CYLINDER HEAD FOR INTERNAL COMBUSTION MOTORS

Original application filed August 30, 1927, Serial No. 216,362. Patent No. 1,726,217, dated August 27, 1929. Divided and this application filed May 7, 1928. Serial No. 275,588.

This application is a division of my copending application now patent entitled Exhaust valve cooling system for internal combustion engines, No. 1,726,217, issued August 27, 1929.

The invention relates to internal combustion engines and particularly pertains to a cylinder head construction for radial type motors.

It is the principal object of the present invention to increase the efficiency of internal combustion motors of the type referred to by providing a cylinder head construction wherein an exchange of heat between the exhaust valve and the combustible mixture drawn into the intake chamber will be effected to pre-heat the combustible mixtures delivered to the cylinder and to assist in maintaining the exhaust valve cooled.

In carrying out the invention into practice, I provide a cylinder head for an internal combustion motor wherein the exhaust valve stem extends through the intake chamber so that the mixture drawn in from the intake manifold will pass around the valve stem and over-heated surfaces of the intake chamber, resulting in an exchange of heat. This exchange of heat pre-heats the indrawn gases and assists in maintaining the exhaust valve stem cooled.

One form which the invention may assume is exemplified in the following description and illustrated by way of example in the accompanying drawings, in which.

Figure 1:
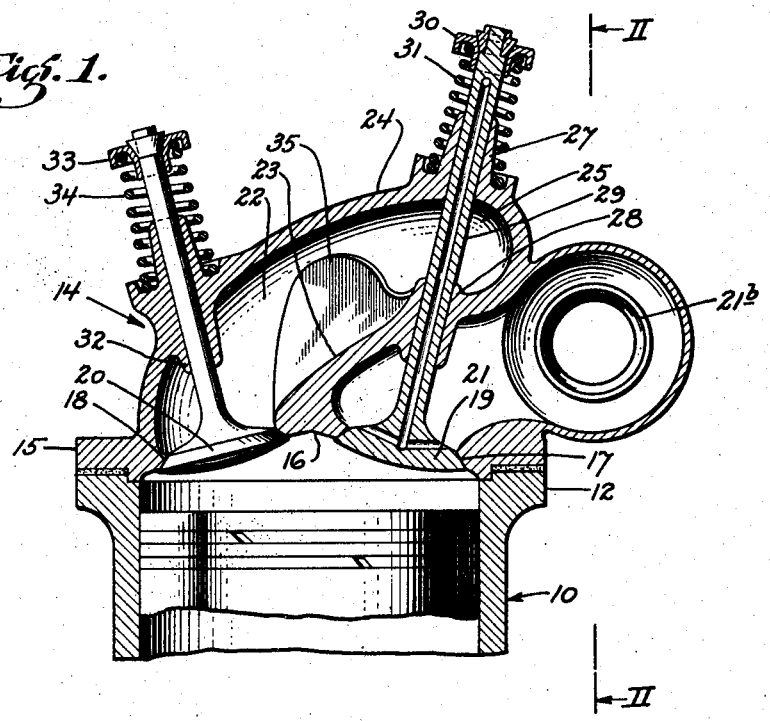
Fig. 1 is a central vertical section through a cylinder head embodying the preferred form of my invention.
Figure 2:
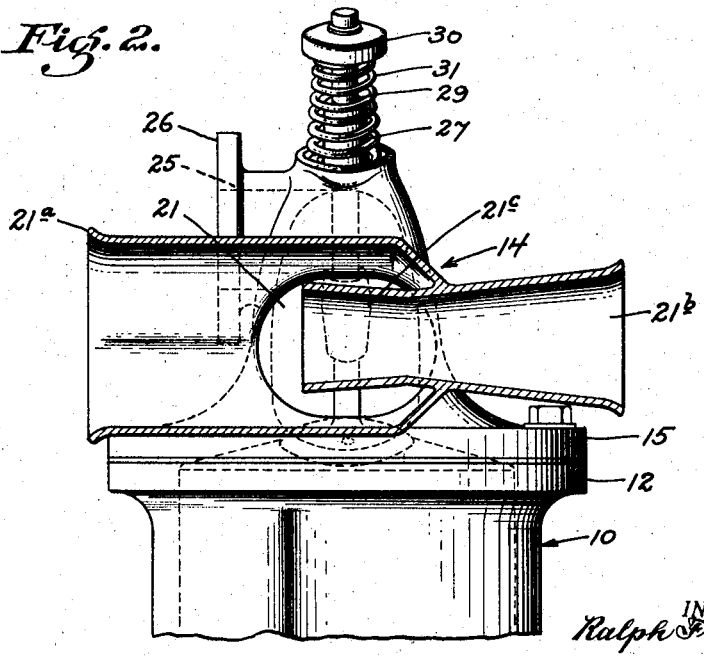
Fig. 2 is a view in section taken on line II—II of Fig. 1.

Referring more particularly to the accompanying drawings, 10 indicates a cylinder of an internal combustion motor. The embodiment of the invention shown in the accompanying drawings is for radial motors wherein the cylinders are arranged singly about a central point. In this type of engine each cylinder has a separate cylinder head, the intake ports of which are connected together by a manifold.

In the present instance the cylinder is indicated by the the numeral 10 and is illustrated as having a surrounding flange 12 at its end. A cylinder head 14 is formed with a flange 15 complementary to the flange 12 so that the cylinder head may be securely bolted or otherwise secured to the cylinder 10. This manner of connecting the cylinder head to the cylinder permits the head to be easily and quickly removed for the purpose of making adjustments or repairs.

Reference being had to Fig. 1, it will be seen that at its bottom the cylinder head 14 is formed with a concaved wall 16 which acts to enclose the end of the cylinder when the head is fitted thereto. This formation of the bottom wall 16 of the cylinder head forms a conical shaped combustion chamber within the cylinder when the piston in the cylinder reaches the outer end of its stroke.

Formed in the wall 16 of the cylinder head is an exhaust port 17 and an intake port 18. These ports are located upon opposite sides of the center of the cylinder and are each surrounded by a conventional form of valve seat. Cooperating with these valve seats at the exhaust and intake ports are an exhaust valve 19 and an intake valve 20.

Communicating with the exhaust port is an exhaust chamber 21 and communicating with the intake port 18 is an intake chamber 22. Both of these chambers are disposed at an angle to the central axis of the cylinder. A central wall 23 separates the intake chamber from the exhaust chamber. It will be noted that this central wall 23 commences from the center of the cylinder head at the wall 16 and extends at an angle to the axis of the cylinder so that the intake chamber 22 will overlie the exhaust chamber and the exhaust port 17. The other wall of the intake chamber or that indicated by numeral 24 is the outer wall of the cylinder head. At its upper end the intake chamber is formed with a tubular section 25 which is formed with a flange 26 so that the intake chamber may be connected with any suitable intake manifold.

Arranged contiguous to the exhaust chamber 21 is an open ended barrel 21a and a Venturi tube 21b which extends coaxially within the barrel 21a, The latter is in communication through a port 21c with the exhaust chamber 21. The larger end of the Venturi tube 21b extends forwardly of the engine so that when the motor is in operation, driving a plane, a considerable draft of air will be forced through the Venturi tube, creating a suction in the exhaust chamber 21 and through the exhaust valve 19. This acts to cool the exhaust valve and scavenge the exhaust chamber as described and claimed in my co-pending application hereinbefore referred to and of which this application is a division.

Reference being had to Fig. 1 it will be seen that the wall 23 dividing the intake chamber 22 from the exhaust chamber 21 and the outer wall 24 are formed with aligned valve guides 27 and 28 in which the valve stem 29 of the exhaust valve 19 reciprocates. The outer end of the valve stem 29 of the exhaust valve is fitted with the usual retaining cup 30 between which and the wall 24 a valve spring 31 is interposed.

To guide the intake valve, a valve guide 32 is formed on the wall 24 and through which the stem of the intake valve is guided. The intake valve is also fitted with the usual retainer cup 33 and valve spring 34.

It should be stated that as the means for operating the valves forms no part of the present invention, it is not here shown it being sufficient to state that these valves are operated in synchronism with the piston as in the ordinary type of four cycle engine.

The intake and exhaust valves 19 and 20 are arranged at opposite angles relative to the central axis of the cylinder. The stem 29 of the exhaust valve 19 projects through the intake chamber 22 at the center of the tubular portion 25 of the intake chamber so that any gases drawn in from the intake manifold must pass around the exhaust valve stem befor passing to the intake port 18.

When the motor is on the suction stroke with the intake valve open, a partial vacuum is created in the intake chamber 22 and cool gases are drawn into the intake chamber from the intake manifold and carburetor. These gases when passing into the intake chamber 22 will pass around the exhaust valve stem 29 and an exchange of heat will be effected. The exhaust valve stem being very hot when the engine is in operation will transfer some of its heat to the incoming cool gases and thereby be maintained cool while the combustible gases entering the chamber 22 will be preheated so that a higher efficiency in the motor will be obtained.

I find in actual practice that a certain amount of fuel condensate will find its way into the valve guide 28 and keep the same and the valve stem free from carbon.

The gases will also be heated by passing over the lower portion of the wall 23 and cooling fins 35 which project within the intake chamber 22 from the lower portion of the wall 23. It will be seen that heat will be conducted from the wall 16 to the wall 23 and thence to the fins 35. This heat will be dissipated to a certain extent by the incoming cool gases which acts both to heat the gases to more thoroughly vaporize them, and also to aid in maintaining the cylinder head cool.

The cooling effects resulting from the construction just described will be of great benefit in the operation of the exhaust valve as the latter will be maintained at an even cool temperature and will be prevented from sticking in its guide and from warping due to being overheated.

In operation of the device the cylinder head is constructed as previously described and fitted to the end of the cylinder. The intake chamber 22 is then connected with the intake manifold and valve operating mechanism is operatively associated with the intake and exhaust valves so as to operate them in synchronism with the strokes of the piston. When the motor is placed in operation, the cool incoming gases will pass around the exhaust valve stem 29 and over the fins 35 and will be injected into the cylinder in a preheated condition which makes for perfect combustion. An exchange of heat will be effected during the passage of gases into the cylinder which will cool the exhaust valve stem and cylinder head walls. It should be pointed out here that it will be impossible under the present arrangement for raw fuel to enter the cylinder due to the fact that the fuel must pass over several heated surfaces before gaining entrance to the cylinder through the intake port.

I also desire to point out that the exchange of heat between the exhaust valve stem and the incoming cool gases will aid in maintaining the exhaust valve stem cool, so that it will not stick or warp due to excessive heat. Likewise, some of the condensate impinging on the valve stem will find its way into the valve guides 27 and 28 and prevent the deposit of carbon, which causes the valve stem to stick. In actual practice I have found that by such an arrangement, an exhaust valve stem after considerable use will be entirely free from carbonaceous deposits and will reciprocate freely in its guides.

I also desire to point out that due to its simple construction the cylinder head here disclosed may be expeditiously removed so that adjustment and repairs may be made to the valves and valve seats enabling the ordinary aviator to correct any faulty valve action.

From the foregoing it is obvious that I have provided a cylinder head construction for aeroplane engines wherein the combustible mixtures will be thoroughly heated prior to their entrance to the combustion chamber. Also, I have so arranged and constructed the elements of the head that the exhaust valve will be maintained cool so as to eliminate any possibility of its warping or sticking due to becoming overheated. Further, I have provided means, while aiding and maintaining the exhaust cool, to aid in completely scavenging the combustion chamber on the exhaust stroke of the motor.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

In a cylinder head for the cylinder of an internal combustion engine, said cylinder head having an intake and exhaust port, an intake and an exhaust chamber communicating respectively with said ports, the intake chamber having a portion overlying the exhaust port and chamber, a heat radiating wall separating the intake chamber from the exhaust chamber, an intake valve controlling the intake port, an exhaust valve controlling the exhaust port, a valve stem guide formed in the wall separating the intake chamber from the exhaust chamber, the stem of said exhaust valve extending through said guide and through said intake chamber and being exposed in the latter in the path of fuel entering the intake chamber, whereby fuel condensate accumulating on the exposed portion of the stem may enter the guide upon reciprocation of the stem, and fins projecting within the intake chamber from the wall separating the intake chamber from the exhaust chamber.

RALPH FRIEDL.